(12) United States Patent
Tanaka

(10) Patent No.: US 9,434,215 B2
(45) Date of Patent: Sep. 6, 2016

(54) PNEUMATIC TIRE

(71) Applicant: Sumitomo Rubber Industries, Ltd., Kobe-shi, Hyogo (JP)

(72) Inventor: Satoshi Tanaka, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 147 days.

(21) Appl. No.: 14/271,841

(22) Filed: May 7, 2014

(65) Prior Publication Data

US 2015/0007917 A1 Jan. 8, 2015

(30) Foreign Application Priority Data

Jul. 3, 2013 (JP) .................................. 2013-140009

(51) Int. Cl.
*B60C 11/12* (2006.01)
*B60C 11/03* (2006.01)
*B60C 11/11* (2006.01)

(52) U.S. Cl.
CPC .......... *B60C 11/125* (2013.04); *B60C 11/0306* (2013.04); *B60C 11/11* (2013.01); *B60C 11/1236* (2013.04); *B60C 2011/036* (2013.04); *B60C 2011/0346* (2013.04); *B60C 2011/0348* (2013.04); *B60C 2011/0358* (2013.04); (Continued)

(58) Field of Classification Search
CPC ............... B60C 11/03; B60C 11/0306; B60C 11/0309; B60C 2011/0339; B60C 2011/0341; B60C 2011/0346; B60C 2011/0348; B60C 2011/0358; B60C 2011/0372; B60C 11/12; B60C 11/1236; B60C 11/125; B60C 11/124; B60C 11/11; B60C 2011/1213; B60C 2011/036; B60C 2011/0362

USPC ......... 152/209.18, 209.25, 902, 209.16, 209, 152/27

See application file for complete search history.

(56) References Cited

U.S. PATENT DOCUMENTS

| 4,856,571 | A | * | 8/1989 | Collette | ............... B60C 11/0306 152/209.18 |
| 6,026,875 | A | * | 2/2000 | Diensthuber | ............ B60C 11/12 152/209.2 |
| 6,571,844 | B1 | * | 6/2003 | Ochi | ....................... B60C 11/11 152/209.18 |

(Continued)

FOREIGN PATENT DOCUMENTS

| GB | 2051694 | * | 1/1981 |
| JP | 2-155809 | * | 6/1990 |

(Continued)

OTHER PUBLICATIONS

JP2010-116030, May 2010, English language machine translation, Japan Platform for Patent Information.*

(Continued)

*Primary Examiner* — Eric Hug
(74) *Attorney, Agent, or Firm* — Birch, Stewart, Kolasch & Birch, LLP

(57) ABSTRACT

A pneumatic tire is provided with a center land portion between two zigzag crown main grooves, and two middle land portions between two zigzag shoulder main grooves and the two crown main grooves. Each center block is provided with center sipes between which a central part defining the maximum width of the center block is formed. The middle land portion is divided into middle blocks by alternate, oppositely inclined first middle axial grooves and second middle axial grooves. Each middle block is provided with nonparallel middle sipes.

12 Claims, 9 Drawing Sheets

(52) U.S. Cl.
CPC *B60C2011/0362* (2013.04); *B60C 2011/0372* (2013.04); *B60C 2011/1213* (2013.04)

(56) References Cited

U.S. PATENT DOCUMENTS

| | | | | |
|---|---|---|---|---|
| 2008/0121326 A1* | 5/2008 | Ohara | ............... | B60C 11/042 152/209.24 |
| 2011/0146863 A1* | 6/2011 | Ochi | ............... | B60C 11/0306 152/209.18 |
| 2013/0000805 A1* | 1/2013 | Oodaira | ............... | B60C 11/11 152/209.18 |

FOREIGN PATENT DOCUMENTS

| | | | |
|---|---|---|---|
| JP | 06-247110 | * | 9/1994 |
| JP | 2007-118704 A | | 5/2007 |
| JP | 2009-190677 A | | 8/2009 |
| JP | 2010-116030 | * | 5/2010 |

OTHER PUBLICATIONS

JP 2-155809, Jun. 1990, English language abstract, Japan Platform for Patent Information.*

* cited by examiner

PNEUMATIC TIRE

BACKGROUND OF THE INVENTION

The present invention relates to a pneumatic tire, more particularly to a tread pattern capable of improving on-ice performance without sacrificing dry performance and on-snow performance.

In order to increase traction and friction of a pneumatic tire on icy roads, the tread portion of the tire is usually provided with siped blocks which can exert excellent edge effect on icy roads as disclosed in Japanese Patent Application Publication Nos. JP-A-2009-190677 and JP-A-2007-118704.

When a siped block is compared with the non-siped block, the rigidity of the block becomes lower and there is a possibility that dry performance and on-snow performance are deteriorated. From such a viewpoint, the pneumatic tires disclosed in the above publications have room for improvement in achieving dry performance, on-snow performance and on-ice performance at the same time.

SUMMARY OF THE INVENTION

It is therefore, an object of the present invention to provide a pneumatic tire which can be improved in on-ice performance without sacrificing dry performance and on-snow performance.

According to the present invention, a pneumatic tire comprises:

a tread portion provided on each side of the tire equator with a crown main groove and a shoulder main groove both extending circumferentially of the tire to axially divide the tread portion into a center land portion, a pair of middle land portions and a pair of shoulder land portions, the crown main groove and the shoulder main groove each having a zigzag configuration having axially inward vertices and axially outward vertices alternating in the tire circumferential direction, central axial grooves extending from the inward vertices of one of the crown main grooves to the inward vertices of the other crown main groove to divide the center land portion into center blocks, the center blocks each provided with two parallel center sipes extending between the crown main grooves to form a central part of the center block therebetween, wherein the maximum axial width of the center block occurs in the central part, middle axial grooves extending from the outward vertices of the above-mentioned crown main groove to the outward vertices of the above-mentioned shoulder main groove to divide the middle land portion therebetween into middle blocks, the above-mentioned middle axial grooves inclined with respect to the tire axial direction and including first middle axial grooves and second middle axial grooves alternately arranged in the tire circumferential direction, wherein the first middle axial grooves are inclined to one circumferential direction whereas the second middle axial grooves are inclined to the other circumferential direction, and the middle blocks each provided with middle sipes extending from the above-mentioned crown main groove to the above-mentioned shoulder main groove and inclined with respect to the tire axial direction, wherein the middle sipes include a first middle sipe disposed on the middle axial groove side and inclined to the same circumferential direction as the first middle axial groove, and a second middle sipe disposed on the second middle axial groove side and inclined to the same circumferential direction as the second middle axial groove.

Therefore, as the crown main groove and shoulder main groove are zigzag, these main grooves can provide large packed-snow shearing force and exert excellent edge effect to improve on-snow performance and on-ice performance.

Here, the packed-snow shearing force is a shearing force of snow on the road surface which is packed into tread grooves existing in the ground contacting patch of the tire. The larger the packed-snow shearing force, the better the traction or friction on the snowy road.

Since the central axial grooves extend between the inward vertices of the two crown main grooves, the central axial grooves become relatively short, and the decrease in the rigidity of the center land portion becomes minimized. As a result, dry performance can be effectively maintained.

The center blocks with the center sipes can exert excellent edge effect on icy roads to improve on-ice performance.

Since the first middle axial grooves and the second middle axial grooves are inclined to opposite circumferential directions, the middle axial grooves can provide large packed-snow shearing force and exert excellent edge effect multi-directionally and thereby improve on-snow performance and on-ice performance.

Since the circumferential dimension of the middle block is gradually increased in the tire axial direction, the axial deformation of the middle land portion, namely, the middle blocks as a whole is reduced and the steering stability on dry roads can be improved.

The first middle sipe and the second middle sipe can exert edge effect multidirectionally and thereby improve running performance on snowy roads covered with trodden snow or on icy roads.

Since the first middle Sipe and the second middle Sipe are inclined to opposite circumferential directions, the unity of the block or block rigidity is increased and dry performance can be maintained.

The pneumatic tire according to the present invention may be further provided with one or more of the following features (1)-(5):

(1) a tread portion is further provided on the axially outside of the shoulder main groove on each side of the tire equator with a circumferentially continuously extending shoulder narrow groove having a groove width less than that of the shoulder main groove;

(2) the above-mentioned crown main groove and shoulder main groove are each made up of zigzag groove segments each inclined at an angle of from 5 to 10 degrees with respect to the tire circumferential direction;

(3) the central axial grooves and the middle axial grooves are each inclined at an angle of from 5 to 10 degrees with respect to the tire axial direction;

(4) the center blocks are each provide with shallow grooves having a groove width of from 2.5 to 5.5 mm and a groove depth of from 0.5 to 1.5 mm, each of the above-mentioned center sipes is disposed in the groove bottom of one of the above-mentioned shallow grooves, and the middle blocks are each provide with at least one shallow groove having a groove width of from 2.5 to 5.5 mm and a groove depth of from 0.5 to 1.5 mm;

(5) the middle blocks are each provide with a plurality of the shallow grooves, and each of the above-mentioned middle sipes is disposed in the groove bottom of one of the above-mentioned shallow grooves.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

The groove width is a measurement perpendicular to the widthwise center line of the groove unless otherwise noted.

The sipe is a very narrow groove having a groove width of from 0.5 to 1.5 mm.

BRIEF DESCRIPTION OF THE DRAWINGS

Figure 1:
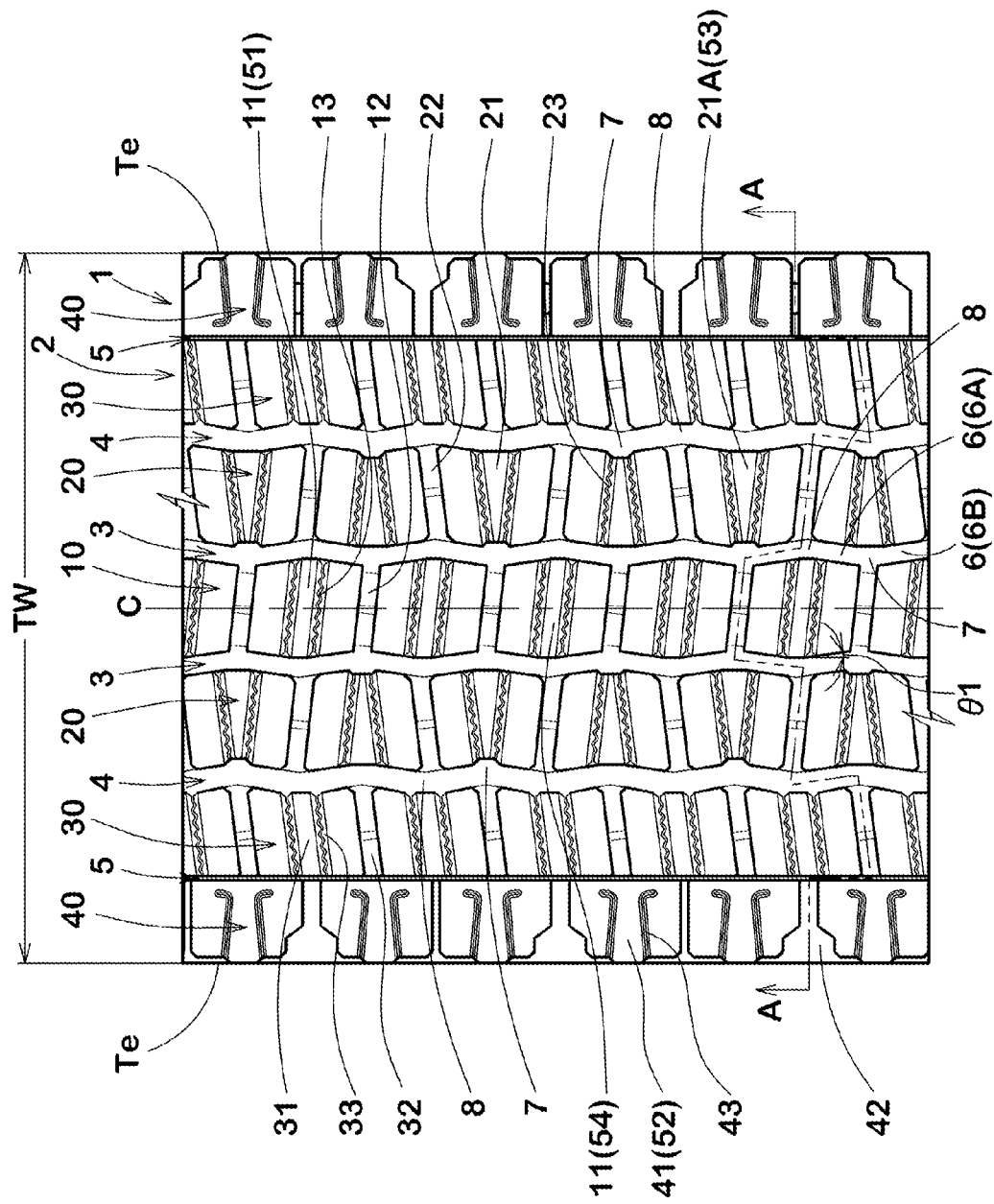
FIG. 1 is a partial developed plan view of a pneumatic tire according to the present invention showing an example of the tread pattern.

Embodiments of the present invention will now be described in detail in conjunction with the accompanying drawings.

According to the present invention, the pneumatic tire comprises, as usual, a tread portion 2, a pair of sidewall portions, a pair of bead portions with a bead core, a carcass extending between the bead portions, and a tread reinforcing cord layer disposed radially outside the carcass in the tread portion.

In the drawings, the pneumatic tire 1 as an embodiment of present invention is designed as a winter tire for heavy duty vehicles such as truck and bus.

The tread portion 2 is provided on each side of the tire equator C with an axially inner crown main groove 3 and an axially outer shoulder main groove 4 each being a circumferentially continuously extending zigzag groove comprising alternate first zigzag segments 6A and second zigzag segments 6B (generically, zigzag segments 6) inclined at angles θ1 of 5 to 10 degrees with respect to the tire circumferential direction so as to increase the packed-snow shearing force and edge effect multidirectionally and thereby improve on-snow performance and on-ice performance. Thus, the zigzag groove has alternate axially inward vertices 7 and axially outward vertices 8.

Figure 2:
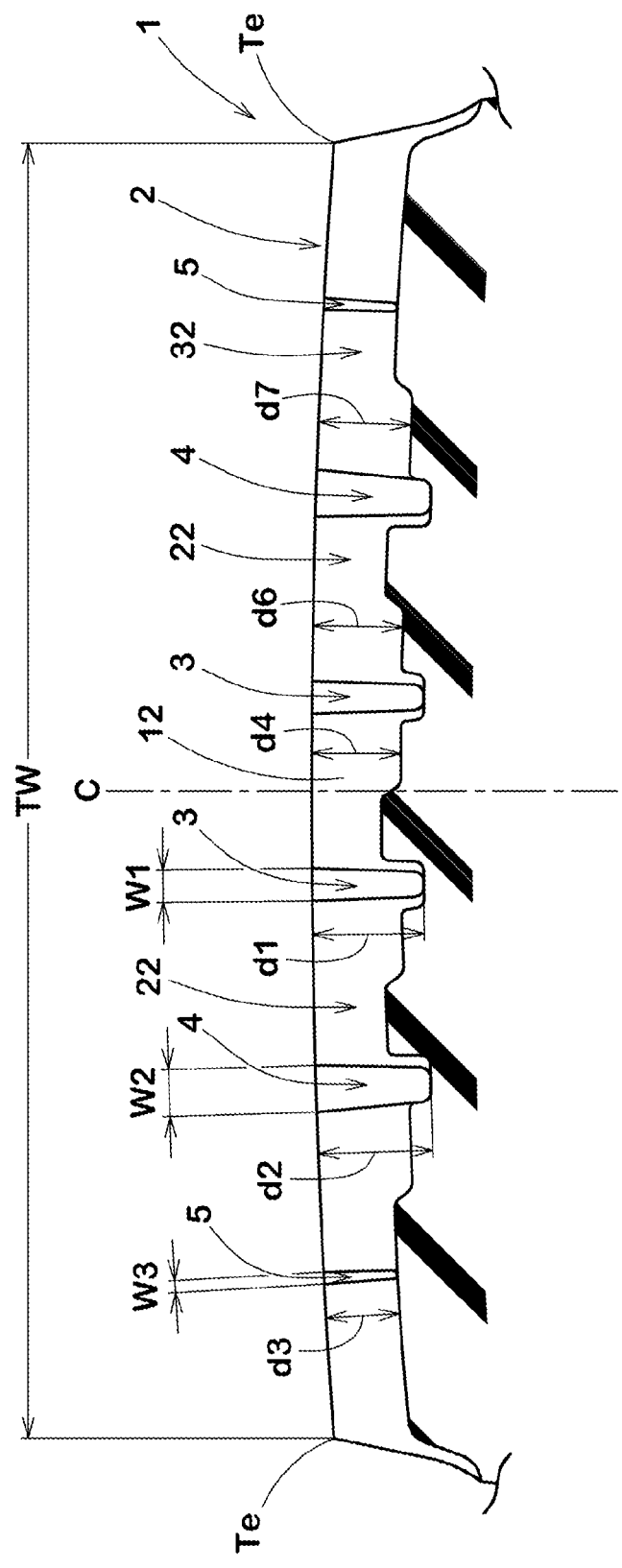
FIG. 2 is a schematic cross sectional view of the tread portion thereof taken along lien A-A in FIG. 1.

If the main grooves 3 and 4 are small in the width or depth, on-snow performance and on-ice performance are liable to deteriorate. If large, the tread portion 2 is decreased in the ground contacting area or rigidity, and the steering stability on dry roads is liable to deteriorate. Therefore, as shown in FIG. 2, the width w1 of the crown main groove 3 and the width w2 of the shoulder main groove 4 are preferably set in a range of from 3% to 7% of the tread width TW. The depth d1 of the crown main groove 3 and the depth d2 of the shoulder main groove 4 are preferably set in a range of from 14.5 to 24.5 mm.

As shown in FIG. 1, on each side of the tire equator, the tread portion 2 is further provided on the axially outside of the shoulder main groove 4 with a circumferentially continuously extending straight shoulder narrow groove 5.

As shown in FIG. 2, the groove width w3 and groove depth d3 of the shoulder narrow groove 5 are set to be less than the groove width w2 and groove depth d2 of the shoulder main groove 4 so as not to lower the rigidity of the tread portion 2 near the tread edge Te and not to decrease the wear resistance of the tread portion 2.

Preferably, the groove width w3 is set in a range of 0.8% to 2.0% of the tread width TW, and the groove depth d3 is set in a range of 11.5 to 21.5 mm.

The tread portion 2 is, as shown in FIG. 1, axially divided into a center land portion 10 between the crown main grooves 3, a pair of middle land portions 20 between the crown main grooves 3 and the shoulder main grooves 4, a pair of inside shoulder land portions 30 between the shoulder main grooves 4 and the shoulder narrow grooves 5, and a pair of outside shoulder land portions 40 axially outside the shoulder narrow grooves 5.

Figure 3:
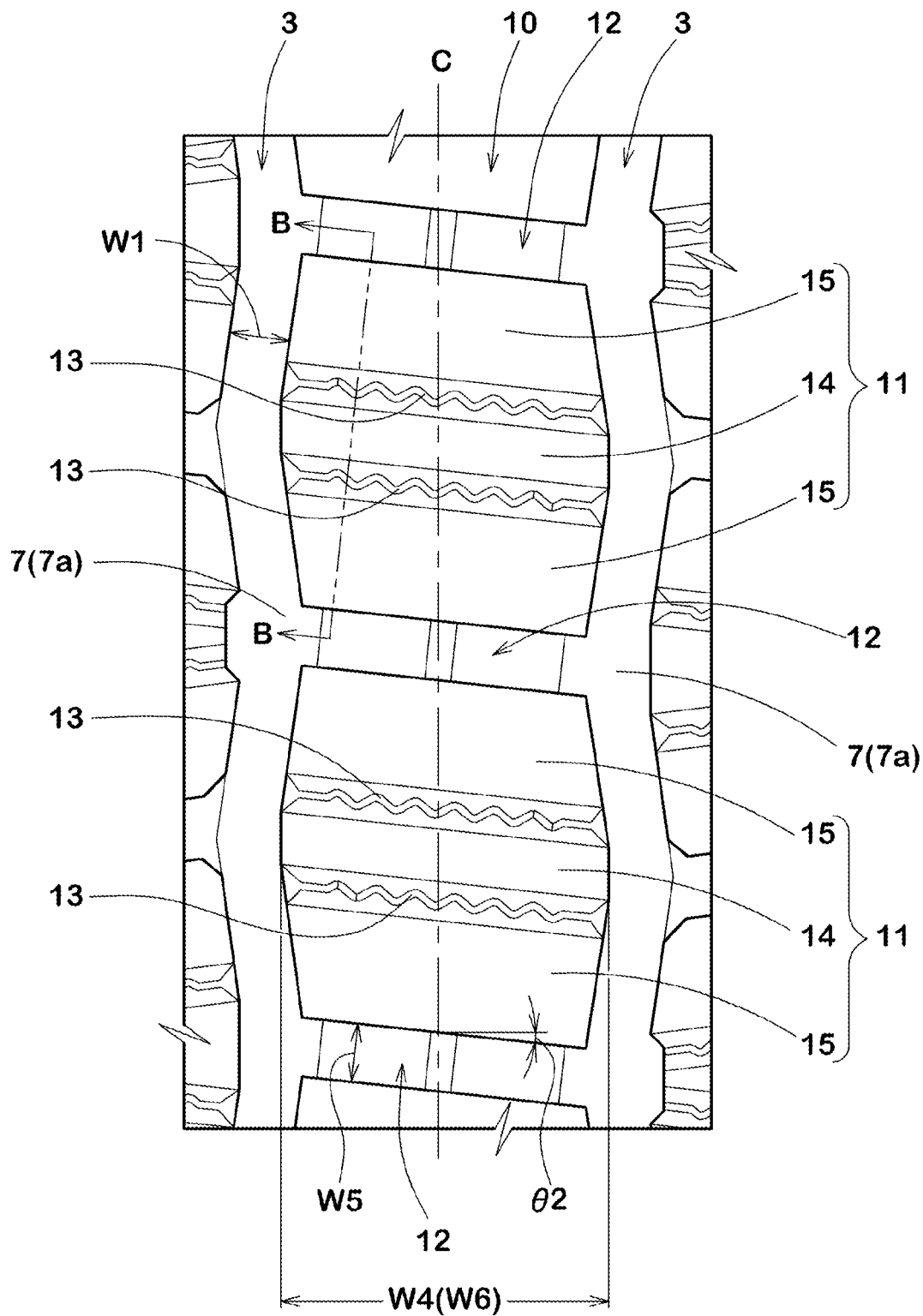
FIG. 3 is a top view of a part of the center land portion thereof.

As shown in FIG.3, the maximum axial width w4 of the center land portion is set in a range of from 0.12 to 0.16 times the tread width TW.

The center land portion 10 is provided with central axial grooves 12 extending between the crown main grooves 3 so that the center land portion 10 is divided into a circumferential row of center blocks 11.

Since the ground pressure of the center land portion 10 is relatively high, the central axial grooves 12 can provide large packed-snow shearing force.

Therefore, in order to improve on-ice performance and on-snow performance while maintaining rigidity necessary for the center land portion, the central axial grooves 12 have a substantially constant groove width w5 which is for example, 1.0 to 1.1 times the groove width w1 of the crown main groove 3.

The groove depth d4 of the central axial grooves 12 is set in a range of from 12.0 to 17.0 mm.

As shown in FIG. 3, the central axial grooves 12 are inclined with respect to the tire axial direction at angles θ2 of not less than 5 degrees, preferably not less than 6 degrees, but not more than 10 degrees, preferably not more than 9 degrees in order to exert the edge effect in the tire lateral direction without deteriorating drainage performance.

The central axial grooves extend from the inward vertices 7a of one of the crown main grooves 3 to the inward vertices 7a of the other crown main groove 3, therefore, the center blocks 11 have a hexagonal shape like a barrel.

The center blocks 11 are each provided with two parallel center sipes 13 which extend across the entire width of the block so that both ends are opened to the crown main grooves 3. Thereby, each center block 11 is subdivided into a central part 14 between the sipes 13 and an end part 15 on each side of the central part 14, namely, between a center sipe 13 and a central axial groove 12.

The maximum axial width w6 of the center block 11 occurs in its central part 14.

The center sipes 13 preferably have a wavy configuration so that the opposite sidewalls of the sipe can engage with each other to reduce axial deformation of the block and the steering stability can be improved.

Figure 4:
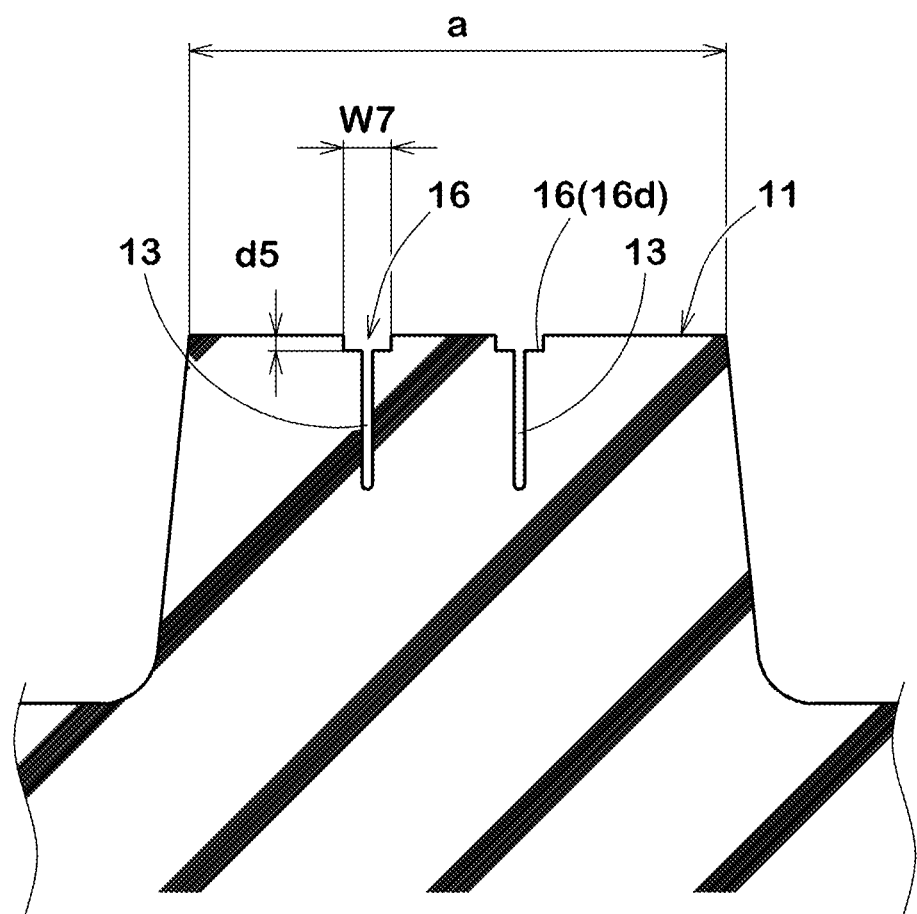
FIG. 4 is a sectional view of the center block taken along line B-B in FIG. 3.

As shown in FIG. 4, each of the center blocks 11 is provided with shallow grooves 16 in order to improve on-snow performance, and the center sipes 13 are each disposed in the bottom 16d of one of the shallow grooves 16.

Preferably, the width w7 of the shallow groove 16 is set in a range of from 2.5 to 5.5 mm, and the depth d5 of the shallow groove 16 is set in a range of from 0.5 to 1.5 mm.

Figure 5:
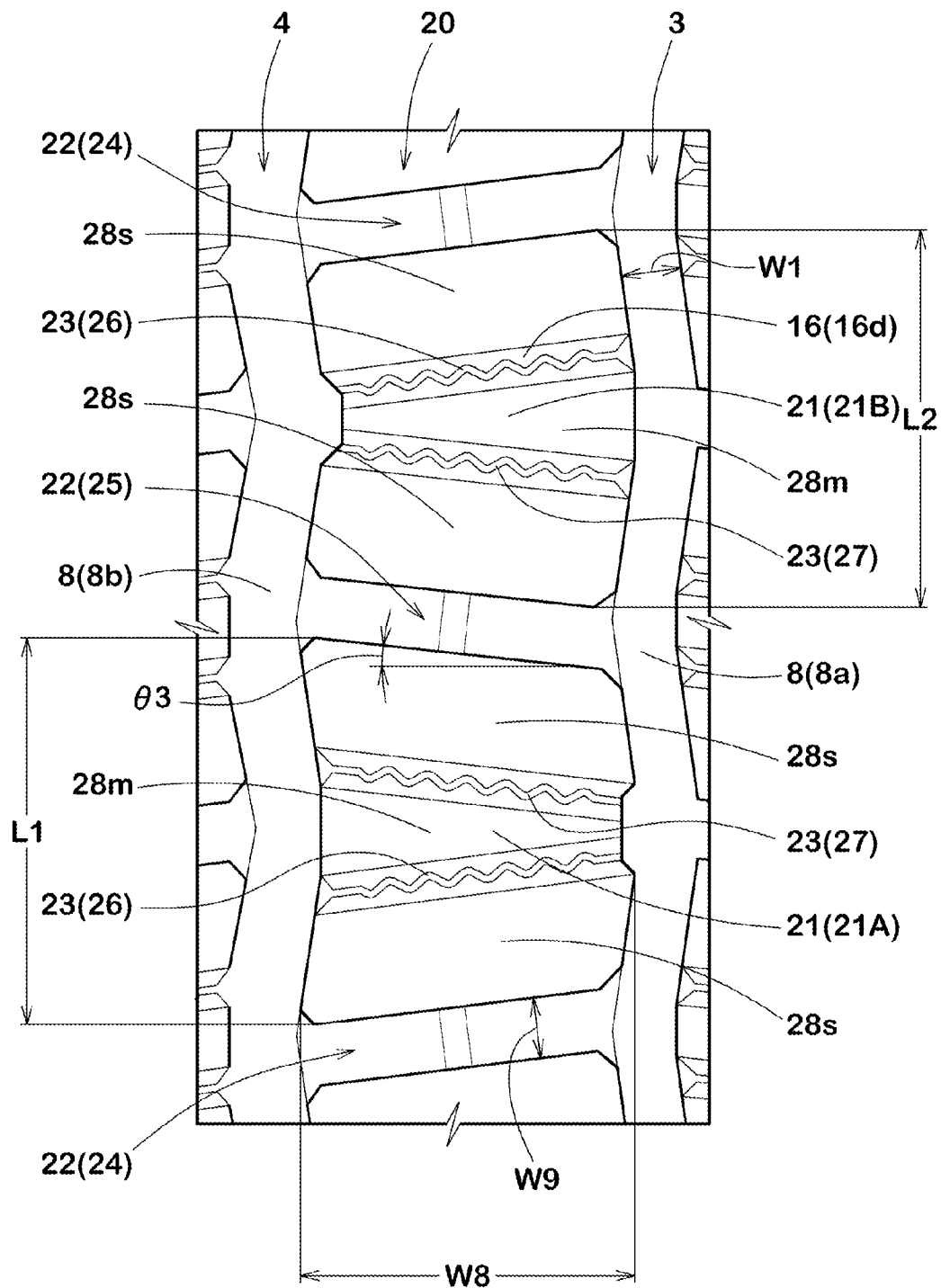
FIG. 5 is a top view of a part of the middle land portion thereof.

As shown in FIG. 5, the maximum axial width w8 of the middle land portion 20 is set in a range of from 0.12 to 0.16 times the tread width TW.

Each of the middle land portions 20 is divided into a circumferential row of middle blocks 21 by middle axial grooves 22 extending from the outward vertices 8a of the crown main groove 3 to the outward vertices 8b of the shoulder main groove 4.

The middle axial grooves 22 have a substantially constant groove width w9 which is in a range of from 1.0 to 1.1 times the width w1 of the crown main groove 3, and the depth d6 of the middle axial groove 22 is set in a range of from 12.0 to 17.0 mm in order to improve on-ice performance and on-snow performance while maintaining rigidity necessary for the middle land portion 20.

As shown in FIG. 5, the middle axial grooves 22 include first middle axial grooves 24 and second middle axial grooves 25. With respect to the tire axial direction, the first middle axial grooves 24 are inclined to one circumferential direction, and the second middle axial grooves 25 are inclined to the other circumferential direction so as to increase the packed-snow shearing force and edge effect multidirectionally and thereby improve on-snow performance and on-ice performance.

The angles θ3 of the middle axial grooves 22 with respect to the tire axial direction are preferably set in a range of not less than 5 degrees, preferably not less than 6 degrees, but not more than 10 degrees, more preferably not more than 9 degrees in order to exert the edge effect in the tire lateral direction without deteriorating drainage performance.

In order to reduce deformation of the land portion in the tire axial direction and thereby improve the steering stability, the first middle axial grooves 24 and the second middle axial grooves 25 alternate in the tire circumferential direction, therefore, the middle blocks 21 have trapezoidal configurations and include alternate first middle blocks 21A having a circumferential dimension L1 gradually increasing toward the axially outside and second middle blocks 21B having a circumferential dimension L2 gradually increasing toward the axially inside.

Each of the middle blocks 21 is provided with two or more, in this example two middle sipes 23 extending from the adjacent crown main groove 3 to the adjacent shoulder main groove 4.

The middle sipes 23 in each middle block 21 include a first middle sipe 26 disposed on the first middle axial groove 24 side and inclined with respect to the tire axial direction to the same direction as the first middle axial groove 24, and a second middle sipe 27 disposed on the second middle axial groove 25 side and inclined with respect to the tire axial direction to the same direction as the second middle axial groove 25. In this embodiment, the first middle sipe 26 is parallel with the first middle axial groove 24, and the second middle sipe 27 is parallel with the second middle axial groove 25.

Such first middle sipe 26 and second middle sipe 27 can exert edge effect multidirectionally and improve running performance on snowy roads covered with trodden snow or icy roads.

During cornering, for example, the block part 28m formed between the first middle sipe 26 and the second middle sipe 27 can contact with the block parts 28s formed between the middle sipes 23 and the middle axial grooves 22 so as to increase the rigidity of the middle block 21 as a whole thereby the dry performance can be effectively improved.

Preferably, the middle sipes 23 have a wavy configuration so that the opposite sidewalls of the sipe can engage with each other to reduce axial deformation of the block and the steering stability can be improved.

It is preferable that the middle sipe 23 is disposed in the bottom 16d of each of the shallow grooves 16 to improve on-snow performance.

Figure 6:
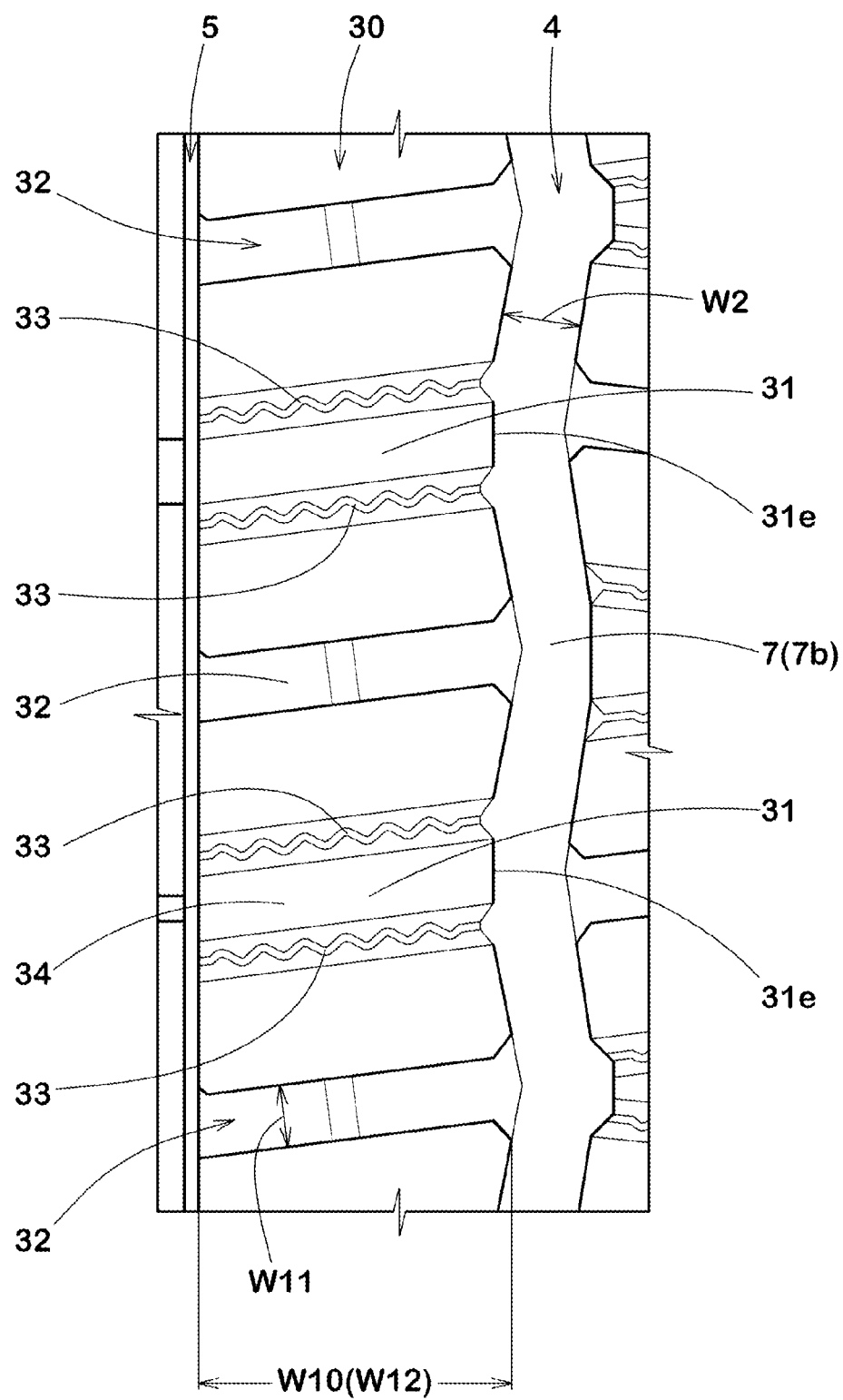
FIG. 6 is a top view of a part of the inside shoulder land portion thereof.

As shown in FIG. 6, the maximum axial width w10 of the inside shoulder land portion 30 is set in a range of from 0.10 to 0.15 times the tread width TW.

Each of the inside shoulder land portions 30 is divided into a circumferential row of inside shoulder blocks 31 by inside shoulder axial grooves 32 extending from the inward vertices 7b of the shoulder main groove 4 to the shoulder narrow groove 5.

The inside shoulder axial grooves 32 are straight grooves. The inside shoulder axial grooves 32 are inclined with respect to the tire axial direction.

In each of the inside shoulder land portions 30, the inside shoulder axial grooves 32 extend in the same direction.

The inside shoulder axial grooves 32 have a substantially constant groove width w11 which is in a range of from 0.85 to 0.95 times the width w2 of the shoulder main groove 4.

The depth d7 of the inside shoulder axial groove 32 is set in a range of from 12.0 to 17.0 mm for example.

Such inside shoulder axial grooves 32 can exert good drainage while maintaining the rigidity of the inside shoulder land portion 30.

As shown in FIG. 6, each of the inside shoulder blocks 31 is provided with two parallel inside shoulder sipes 33 extending across the entire width of the blocks 31 so as to open to the adjacent shoulder main groove 4 and the adjacent shoulder narrow groove 5 in order to improve on-ice performance and on-snow performance and improve the rigidity distribution in the inside shoulder block 31 to improve wear resistance.

The axial width w12 of the inside shoulder block 31 gradually decreases from each of the adjacent inside shoulder axial grooves 32 towards a central part 34 between the two inside shoulder sipe 33 so that the circumferentially extending axially inner edge 31e of the inside shoulder block 31 becomes concave toward the axially outside to improve on-snow performance.

Figure 7:
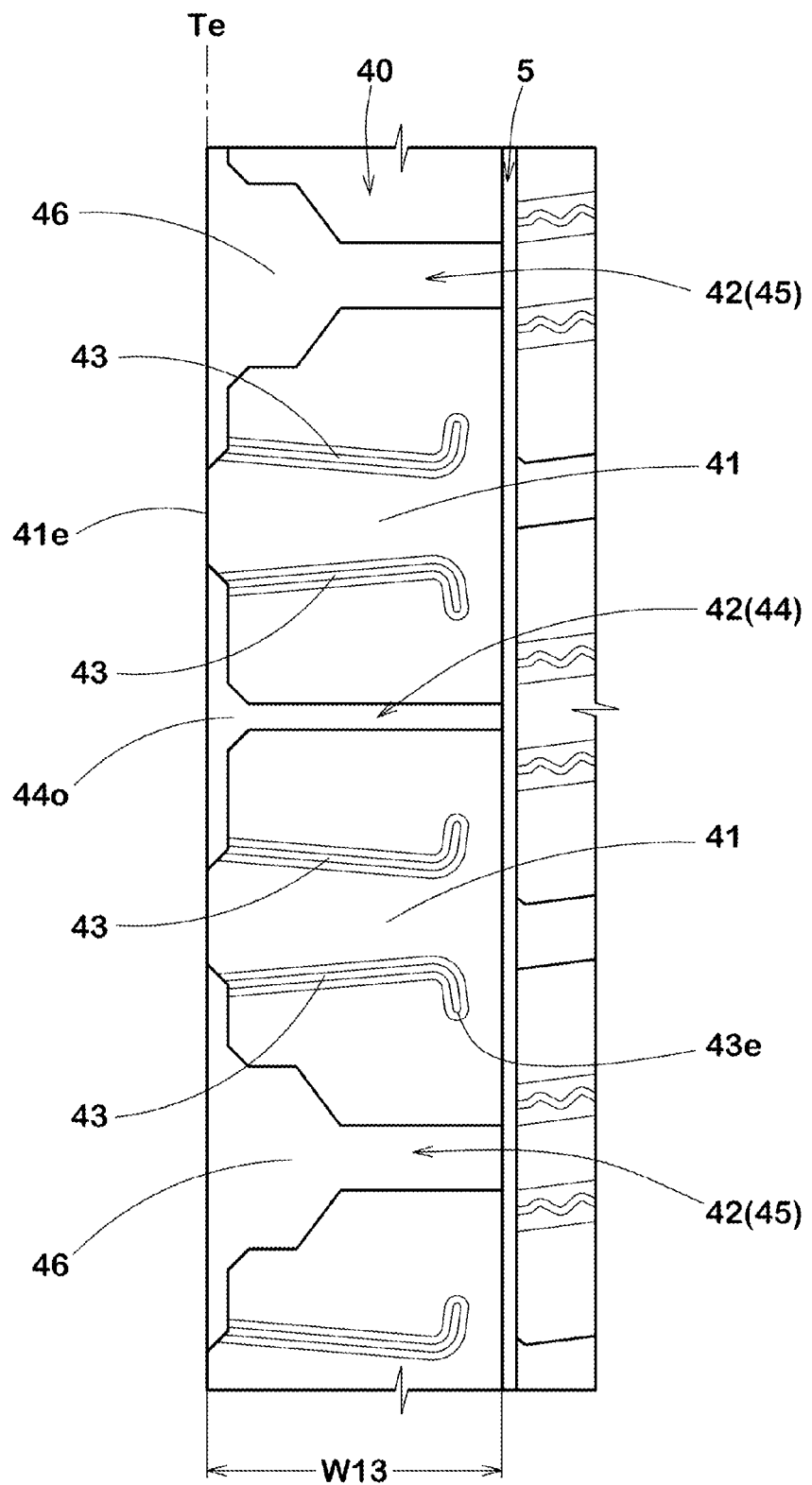
FIG. 7 is a top view of a part of the outside shoulder land portion thereof.

As shown in FIG. 7, the maximum axial width w13 of the outside shoulder land portion 40 is set in a range of from 0.10 to 0.15 times the tread width TW.

Each of the outside shoulder land portions 40 is divided into a circumferential row of outside shoulder blocks 41 by outside shoulder axial grooves 42.

The outside shoulder axial grooves 42 include first outside shoulder axial grooves 44 and second outside shoulder axial groove 45.

The first outside shoulder axial groove 44 has a substantially constant groove width.

The second outside shoulder axial groove 45 has a groove width wider than the first outside shoulder axial groove 44.

The second outside shoulder axial groove 45 comprises a widening part 46 in which the groove width increases toward the axially outside.

The first outside shoulder axial grooves 44 and the second outside shoulder axial grooves 45 alternate in the tire circumferential direction.

Such first outside shoulder axial grooves 44 and second outside shoulder axial grooves 45 can exert good wandering performance without sacrificing on-ice performance and on-snow performance.

Each of the outside shoulder blocks 41 is provided with an outside shoulder sipe 43 extending from the axially outside edge 41e of the block 41 toward the axially inside and terminating within the block 41 in order that the rigidity of the outside shoulder land portion 40 is relatively increased in the axially inside part to improve on-ice performance and the wear resistance in a well balanced manner.

It is preferable that the outside shoulder sipe 43 is bent toward the tire circumferential direction so as to extend for a short distance and then terminated in order to prevent damage of the outside shoulder block 41 such as crack starting from the inner end 43e of the outside shoulder sipe 43.

In the embodiment shown in FIG. 1, in order to improve running performance on icy roads and snowy roads without sacrificing the steering stability especially on dry roads, the land ratio Lr of the tread portion 2 (namely, the ratio Sb/Sa of the total ground contacting area Sb to the overall area Sa of the tread portion) is preferably set in a range of not less than 65%, more preferably not less than 70%, but not more than 80%, more preferably not more than 75%.

Considering the total length E of axial components of all edges of a block appearing in the ground contacting top surface of the block inclusive of edges of a sipe or sipes if provided on the block, a block whose total length is largest (Emax) in the tread portion is referred to as maximum edge block 51, and a block whose total length is smallest (Emin) in the tread portion is referred to as minimum edge block 52.

Figure 8:
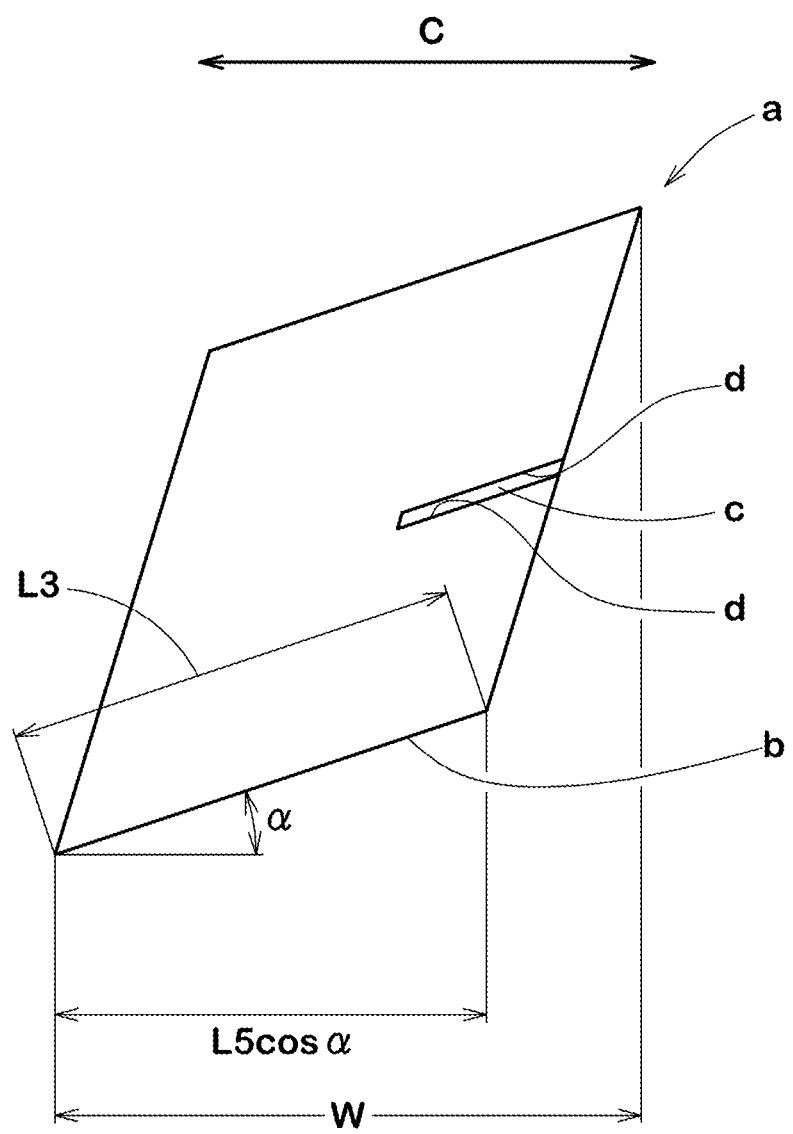
FIG. 8 is a diagram for explaining the axial component of an edge of a block.

FIG. 8 shows a simple example where a block (a) has an edge (b) extending straight at an angle α with respect to the tire axial direction C and having a length L3. In this example, the length of the axial component of the edge (b) is L3×cos α. The block (a) is provided with a straight sipe (c) having two long edges (d) and an ignorable very short edge (without reference sign) at the closed end. Such edges are also included as the edges of the block (a).

In this embodiment, the center blocks 11 are the maximum edge block 51, and the outside shoulder blocks 41 are the minimum edge block 52.

The ratio Emax/Emin of the maximum total length Emax to the minimum length Emin is preferably set in a range of not more than 1.30, more preferably not more than 1.15 in order that the traction of the tread portion becomes uniform across the entire width of the tread portion.

Preferably, the sum Et of the total lengths E (E=total axial components' length) of all the blocks existing in the tread portion 2 is preferably set in a range of not less than 30000 mm, more preferably not less than 32000 mm, but not more than 35000 mm, more preferably not more than 33000 mm.

If less than 30000 mm, there is a possibility that running performance on icy roads and snowy roads is deteriorated. If more than 35000 mm, there is a possibility that steering stability is deteriorated.

Considering the rigidity F of a block in the tire circumferential direction, a block having the highest rigidity (Fmax) in the tread portion 2 is referred to as highest rigidity block 53, and a block having the lowest rigidity (Fmin) in the tread portion 2 is referred to as lowest rigidity block 54.

Figure 9:
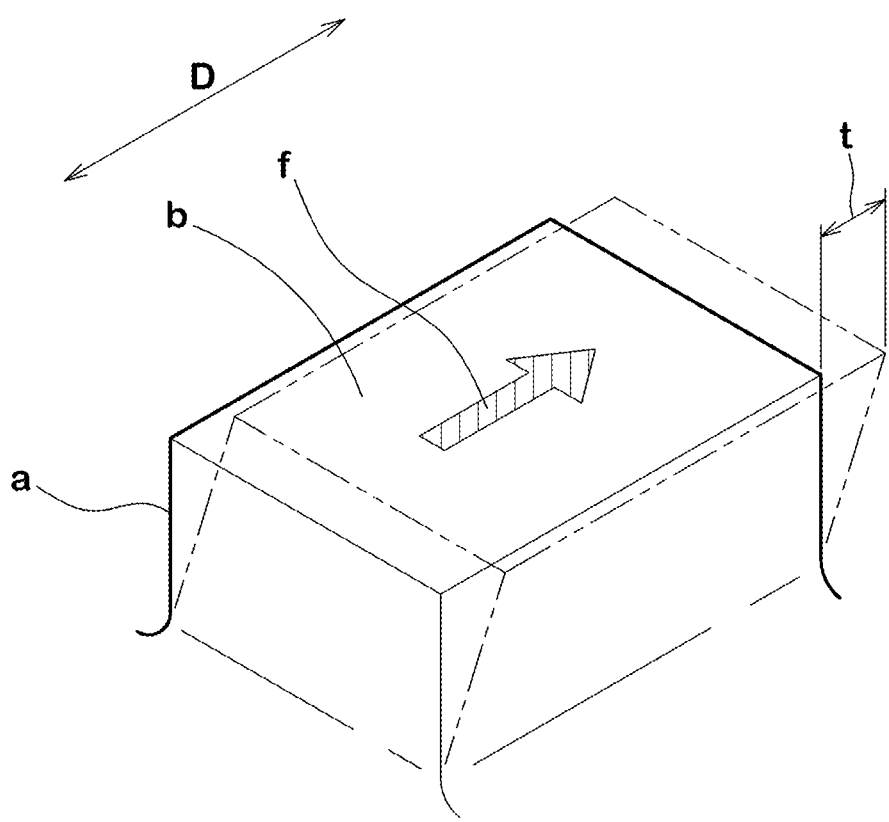
FIG. 9 is a diagram for explaining the circumferential rigidity of a block.

As shown in FIG. 9, when a load in the tire circumferential direction D applied evenly to the top surface (b) of a block (a) whose base is fixed, is increased from zero to a value f, and the resultant displacement of the ground contacting top surface (b) in the tire circumferential direction D is a value t, the circumferential rigidity (F) of the block (a) is given by f/t (N/mm).

In this embodiment, the first middle blocks 21A are the highest rigidity block 53, and the center blocks 11 are the lowest rigidity block 54.

Preferably, the ratio Fmax/Fmin of the highest rigidity Fmax to the lowest rigidity Fmax is set in a range of not more than 1.20, more preferably not more than 1.10.

Comparison Tests

Heavy duty pneumatic tires of size 11R22.5 (rim size 8.25×22.5) were experimentally manufactured. The tires had the same specifications except for specifications shown in Table 1. Using a 10 ton truck of which all wheels were provided with test tires inflated to 900 kPa and which was 50% loaded, the tires were tested for dry performance, on-snow performance, on-ice performance, and wear resistance.

<Dry Performance Test>

Test driver evaluated running performance on dry asphalt roads. The results are indicated in Table 1 by an index based on Ref.1 being 100, wherein the larger value is better.

<On-the-ice Performance Test>

Test driver evaluated running performance on icy roads. The results are indicated in Table 1 by an index based on Ref.1 being 100, wherein the larger value is better.

<On-the-snow Performance Test>

Test driver evaluated running performance on showy roads. The results are indicated in Table 1 by an index based on Ex.1 being 100, wherein the larger value is better.

<Wear Resistance Test>

After running on dry road for a predetermined distance, the amount of wear was measured. The results are indicated in Table 1 by an index based on Ex.1 being 100, wherein the larger value is better.

TABLE 1

| Tire | Ref. 1 | Ex.1 | Ex.2 | Ex.3 | Ex.4 | Ex.5 | Ex.6 | Ex.7 |
|---|---|---|---|---|---|---|---|---|
| main groove configuration | straight | zigzag | zigzag | zigzag | zigzag | zigzag | zigzag | zigzag |
| main groove angle θ1 (deg.) | 0.0 | 7.0 | 5.0 | 10.0 | 7.0 | 7.0 | 7.0 | 7.0 |
| central axial groove angle θ2 (deg.) | 7.0 | 7.0 | 7.0 | 7.0 | 5.0 | 10.0 | 7.0 | 7.0 |
| middle axial groove angle θ3 (deg.) | 7.0 | 7.0 | 7.0 | 7.0 | 5.0 | 10.0 | 7.0 | 7.0 |
| middle sipe *1 | N | Y | Y | Y | Y | Y | Y | Y |
| shallow groove *1 | Y | Y | Y | Y | Y | Y | N | Y |
| Emax/Emin | 1.0 | 1.0 | 1.0 | 1.0 | 1.0 | 1.0 | 1.0 | 1.05 |
| Fmax/Fmin | 1.0 | 1.0 | 1.0 | 1.0 | 1.0 | 1.0 | 1.0 | 1.0 |
| dry performance | 100 | 100 | 100 | 98 | 100 | 99 | 100 | 100 |
| on-snow performance | 100 | 110 | 109 | 110 | 109 | 111 | 110 | 110 |
| on-ice performance | 100 | 110 | 109 | 111 | 108 | 112 | 110 | 110 |
| wear resistance | 100 | 100 | 101 | 99 | 102 | 98 | 100 | 100 |

| Tire | Ex.8 | Ex.9 | Ex. 10 | Ex.11 | Ex.12 | Ex.13 | Ex.14 | Ex.15 |
|---|---|---|---|---|---|---|---|---|
| main groove configuration | zigzag | zigzag | zigzag | zigzag | zigzag | zigzag | zigzag | zigzag |
| main groove angle θ1 (deg.) | 7.0 | 7.0 | 7.0 | 7.0 | 7.0 | 7.0 | 7.0 | 7.0 |
| central axial groove angle θ2 (deg.) | 7.0 | 7.0 | 7.0 | 7.0 | 7.0 | 7.0 | 7.0 | 7.0 |
| middle axial groove angle θ3 (deg.) | 7.0 | 7.0 | 7.0 | 7.0 | 7.0 | 7.0 | 7.0 | 7.0 |
| middle sipe *1 | Y | Y | Y | Y | Y | Y | Y | Y |
| shallow groove *1 | Y | Y | Y | Y | Y | Y | Y | Y |
| Emax/Emin | 1.1 | 1.2 | 1.3 | 1.4 | 1.0 | 1.0 | 1.0 | 1.0 |
| Fmax/Fmin | 1.0 | 1.0 | 1.0 | 1.0 | 1.05 | 1.1 | 1.2 | 1.3 |
| dry performance | 100 | 100 | 100 | 100 | 100 | 100 | 100 | 99 |
| on-snow performance | 110 | 110 | 109 | 109 | 110 | 110 | 109 | 109 |
| on-ice performance | 109 | 109 | 109 | 108 | 110 | 109 | 109 | 109 |
| wear resistance | 100 | 99 | 99 | 99 | 100 | 100 | 100 | 99 |

*1) N: not provided, Y: provided

The invention claimed is:

1. A pneumatic tire comprising:
a tread portion provided on each side of the tire equator with a crown main groove and a shoulder main groove both extending circumferentially of the tire to axially divide the tread portion into a center land portion, a pair of middle land portions and a pair of shoulder land portions,
the crown main groove and the shoulder main groove each having a zigzag configuration having axially inward vertices and axially outward vertices alternating in the tire circumferential direction,
central axial grooves extending from the inward vertices of one of the crown main grooves to the inward vertices of the other crown main groove to divide the center land portion into center blocks,
the center blocks each being provided with two parallel center sipes extending between the crown main grooves to form a central part of the center block therebetween, wherein the maximum axial width of the center block occurs in the central part,
middle axial grooves extending from the outward vertices of said crown main groove to the outward vertices of said shoulder main groove to divide the middle land portion therebetween into middle blocks,
said middle axial grooves being inclined with respect to the tire axial direction and including first middle axial grooves and second middle axial grooves alternately arranged in the tire circumferential direction, wherein the first middle axial grooves are inclined to one circumferential direction whereas the second middle axial grooves are inclined to the other circumferential direction, and
the middle blocks each being provided with middle sipes extending from said crown main groove to said shoulder main groove and inclined with respect to the tire axial direction,
wherein the middle sipes include
a first middle sipe disposed on the first middle axial groove side and inclined to the same circumferential direction as the first middle axial groove, and
a second middle sipe disposed on the second middle axial groove side and inclined to the same circumferential direction as the second middle axial groove,
and wherein
the center blocks are each provided with shallow grooves having a groove width of from 2.5 to 5.5 mm and a groove depth of from 0.5 to 1.5 mm,
each said center sipe is disposed in the groove bottom of one of said shallow grooves, and
the middle blocks are each provided with at least one shallow groove having a groove width of from 2.5 to 5.5 mm and a groove depth of from 0.5 to 1.5 mm.

2. The pneumatic tire according to claim 1, wherein a tread portion is further provided on the axially outside of the shoulder main groove on each side of the tire equator with a circumferentially continuously extending shoulder narrow groove having a groove width less than that of the shoulder main groove.

3. The pneumatic tire according to claim 1, wherein said crown main groove and said shoulder main groove are each made up of zigzag groove segments each inclined at an angle of from 5 to 10 degrees with respect to the tire circumferential direction.

4. The pneumatic tire according to claim 1, wherein the central axial grooves and the middle axial grooves are each inclined at an angle of from 5 to 10 degrees with respect to the tire axial direction.

5. The pneumatic tire according to claim 1, wherein the middle blocks are each provided with a plurality of the shallow grooves, and each said middle sipe is disposed in the groove bottom of one of said shallow grooves.

6. The pneumatic tire according to claim 2, wherein said crown main groove and said shoulder main groove are each made up of zigzag groove segments each inclined at an angle of from 5 to 10 degrees with respect to the tire circumferential direction.

7. The pneumatic tire according to claim 2, wherein the central axial grooves and the middle axial grooves are each inclined at an angle of from 5 to 10 degrees with respect to the tire axial direction.

8. The pneumatic tire according to claim 3, wherein the central axial grooves and the middle axial grooves are each inclined at an angle of from 5 to 10 degrees with respect to the tire axial direction.

9. A pneumatic tire comprising:
a tread portion provided on each side of the tire equator with a crown main groove and a shoulder main groove both extending circumferentially of the tire to axially divide the tread portion into a center land portion, a pair of middle land portions and a pair of shoulder land portions,
the crown main groove and the shoulder main groove each having a zigzag configuration having axially inward vertices and axially outward vertices alternating in the tire circumferential direction,
central axial grooves extending from the inward vertices of one of the crown main grooves to the inward vertices of the other crown main groove to divide the center land portion into center blocks,
the center blocks each being provided with two parallel center sipes extending between the crown main grooves to form a central part of the center block therebetween, wherein the maximum axial width of the center block occurs in the central part,
middle axial grooves extending from the outward vertices of said crown main groove to the outward vertices of said shoulder main groove to divide the middle land portion therebetween into middle blocks,
said middle axial grooves being inclined with respect to the tire axial direction and including first middle axial grooves and second middle axial grooves alternately arranged in the tire circumferential direction, wherein the first middle axial grooves are inclined to one circumferential direction whereas the second middle axial grooves are inclined to the other circumferential direction, and
the middle blocks each being provided with middle sipes extending from said crown main groove to said shoulder main groove and inclined with respect to the tire axial direction,
wherein the middle sipes include
a first middle sipe disposed on the first middle axial groove side and inclined to the same circumferential direction as the first middle axial groove, and
a second middle sipe disposed on the second middle axial groove side and inclined to the same circumferential direction as the second middle axial groove, wherein
the center blocks are each provided with shallow grooves having a groove width of from 2.5 to 5.5 mm and a groove depth of from 0.5 to 1.5 mm, and
each said center sipe is disposed in the groove bottom of one of said shallow grooves.

10. The pneumatic tire according to claim 9, wherein the middle blocks are each provided with a plurality of the shallow grooves, and each said middle sipe is disposed in the groove bottom of one of said shallow grooves.

11. A pneumatic tire comprising:
a tread portion provided on each side of the tire equator with a crown main groove and a shoulder main groove both extending circumferentially of the tire to axially divide the tread portion into a center land portion, a pair of middle land portions and a pair of shoulder land portions,
the crown main groove and the shoulder main groove each having a zigzag configuration having axially inward vertices and axially outward vertices alternating in the tire circumferential direction,
central axial grooves extending from the inward vertices of one of the crown main grooves to the inward vertices of the other crown main groove to divide the center land portion into center blocks,
the center blocks each being provided with two parallel center sipes extending between the crown main grooves to form a central part of the center block therebetween, wherein the maximum axial width of the center block occurs in the central part,
middle axial grooves extending from the outward vertices of said crown main groove to the outward vertices of said shoulder main groove to divide the middle land portion therebetween into middle blocks,
said middle axial grooves being inclined with respect to the tire axial direction and including first middle axial grooves and second middle axial grooves alternately arranged in the tire circumferential direction, wherein the first middle axial grooves are inclined to one circumferential direction whereas the second middle axial grooves are inclined to the other circumferential direction, and
the middle blocks each being provided with middle sipes extending from said crown main groove to said shoulder main groove and inclined with respect to the tire axial direction,
wherein the middle sipes include
a first middle sipe disposed on the first middle axial groove side and inclined to the same circumferential direction as the first middle axial groove, and
a second middle sipe disposed on the second middle axial groove side and inclined to the same circumferential direction as the second middle axial groove, wherein
each of the middle blocks is provided with shallow grooves each having a groove width of from 2.5 to 5.5 mm and a groove depth of from 0.5 to 1.5 mm, and
each said middle sipe is disposed in the groove bottom of one of said shallow grooves.

12. The pneumatic tire according to claim 11, wherein the middle blocks are each provided with a plurality of the shallow grooves, and each said middle sipe is disposed in the groove bottom of one of said shallow grooves.

* * * * *